(12) United States Patent
Liu et al.

(10) Patent No.: US 8,699,417 B2
(45) Date of Patent: Apr. 15, 2014

(54) MICROWAVE BACKHAUL ARRANGEMENTS

(75) Inventors: Chunming Liu, Redmond, WA (US);
Christopher Lawrence, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 227 days.

(21) Appl. No.: 13/155,336

(22) Filed: Jun. 7, 2011

(65) Prior Publication Data

US 2012/0275375 A1 Nov. 1, 2012

Related U.S. Application Data

(60) Provisional application No. 61/481,146, filed on Apr. 29, 2011.

(51) Int. Cl.
*H04W 4/00* (2009.01)
*H04L 12/28* (2006.01)
*H04L 12/56* (2006.01)

(52) U.S. Cl.
USPC .......................................... 370/328; 370/392

(58) Field of Classification Search
USPC .......................................... 370/328, 389, 392
See application file for complete search history.

(56) References Cited

U.S. PATENT DOCUMENTS

| 6,845,094 | B1* | 1/2005 | Zhang ............................. 370/349 |
| 2001/0022558 | A1* | 9/2001 | Karr et al. ...................... 342/450 |
| 2002/0018470 | A1* | 2/2002 | Galicki et al. ................. 370/392 |
| 2002/0105926 | A1* | 8/2002 | Famolari et al. .............. 370/331 |
| 2004/0057530 | A1* | 3/2004 | Tarokh et al. ................. 375/267 |
| 2004/0059829 | A1* | 3/2004 | Chu et al. ....................... 709/238 |
| 2005/0083899 | A1* | 4/2005 | Babbar et al. ................. 370/342 |
| 2005/0262264 | A1* | 11/2005 | Ando et al. ................... 709/233 |
| 2006/0268909 | A1* | 11/2006 | Langevin et al. ............. 370/405 |
| 2008/0268848 | A1* | 10/2008 | Tomoe et al. ................. 455/436 |
| 2010/0325209 | A1* | 12/2010 | Thapa ........................... 709/204 |
| 2012/0134257 | A1* | 5/2012 | Knox ............................. 370/218 |

* cited by examiner

*Primary Examiner* — Ronald Abelson
(74) *Attorney, Agent, or Firm* — SpryIP, LLC

(57) ABSTRACT

Described herein are techniques related to wireless communication systems that may implement microwave backhaul for connectivity between network elements deployed by the wireless communication systems. This Abstract is submitted with the understanding that it will not be used to interpret or limit the scope or meaning of the claims.

15 Claims, 8 Drawing Sheets

MICROWAVE BACKHAUL ARRANGEMENTS

RELATED APPLICATIONS

This application claims priority benefit of U.S. Provisional Application 61/481,146, which was filed on Apr. 29, 2011. The entire contents of the Provisional Application are hereby incorporated herein by reference.

BACKGROUND

Wireless communication systems have become commonplace. A conventional wireless communication system comprises a number of access points, such as base stations. Subscribers communicate bi-directionally with the base stations. The data at the access points must be delivered to a centralized point-of-presence, such as a mobile switching center (MSC). The communication links between the distributed access points (e.g., the base stations) and the centralized access point (e.g., the MSC) are referred to as a backhaul.

The backhaul communication pathways may be implemented using a variety of known technologies. For example, the base station may be coupled to the MSC using a wire or optical fiber. Microwave communication links may also be used to implement portions of the communication links associated with the backhaul.

Communication systems may provide multiple different communication pathways to implement the backhaul. For example, a base station may be coupled to the MSC using a microwave link and a copper wire.

In one particular implementation, a wireless communication system includes a plurality of base stations. One or more of the base stations are coupled to another base station by way of a microwave communication link. Furthermore, one or more of the base stations may be coupled to a carrier network. The wireless communication system may implement a plurality of carrier networks that are coupled using routers. The MSC may be coupled to at least one of the carrier networks.

SUMMARY

Described herein are techniques related to wireless communication systems that may implement microwave backhaul for connectivity between network elements deployed by the wireless communication systems.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

DETAILED DESCRIPTION

Described herein are techniques related to wireless communication systems that may implement microwave backhaul for connectivity between network elements deployed by the wireless communication systems.

Figure 1:
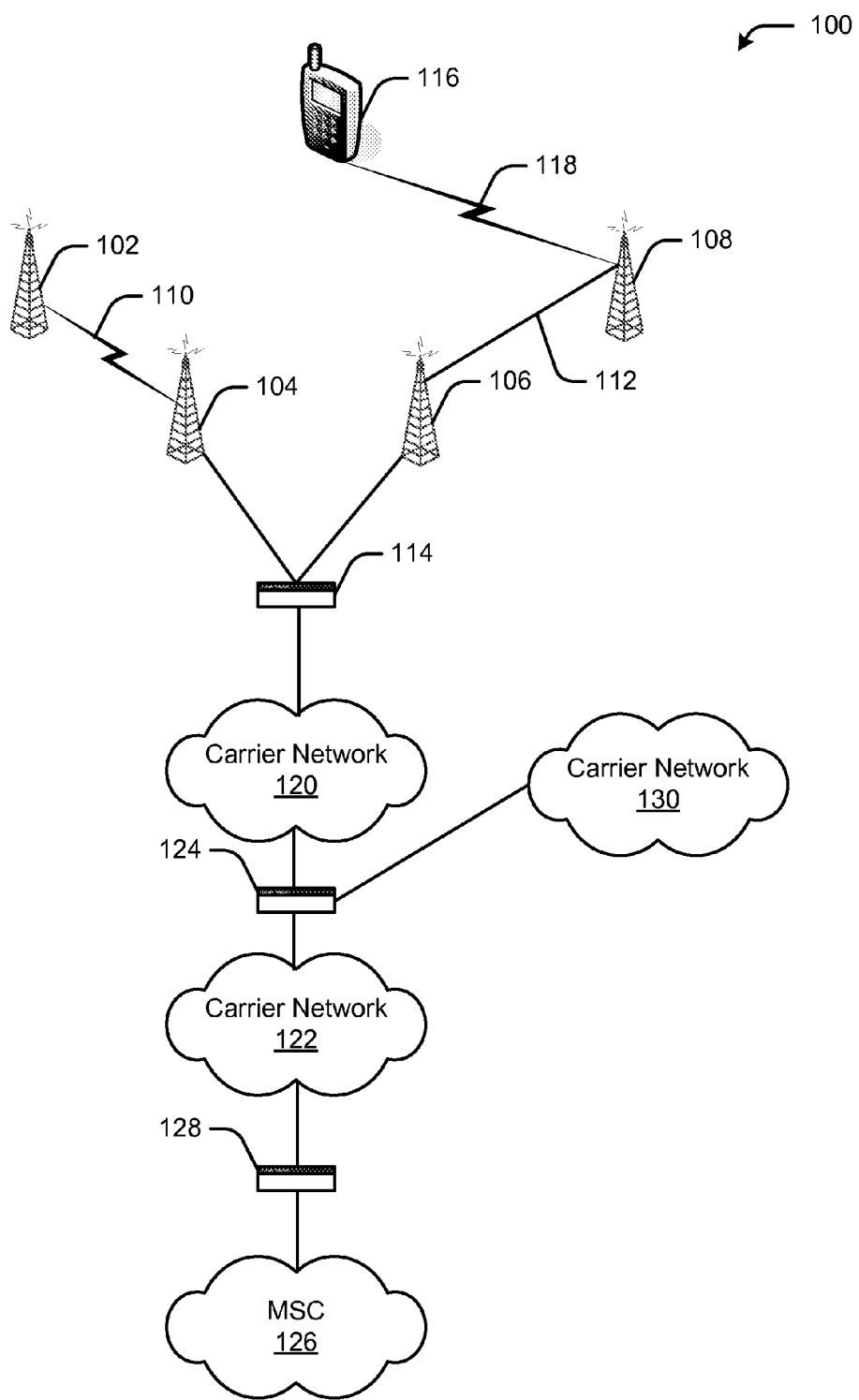
FIG. 1 illustrates an exemplary wireless communication system.

FIG. 1 illustrates an exemplary wireless communication system 100. The wireless system 100 may employ multiple base stations 102, 104, 106 and 108. The base station 102 is shown as being coupled to the base station 104 by way of a microwave communication link 110. The base station 108 is shown as being coupled to the base station 106 using a wire or optical link 112. Each of the base stations 104 and 106 is shown as being coupled to a router 114 (e.g., an edge router). The link between the router 114 and the base stations 104 and 106 may be wire or microwave link implemented. A wireless device 116, such as a mobile phone, may be coupled to the base station 108 via wireless signals 118.

A plurality of carrier networks 120 and 122 may be used in the wireless communication system 100. A router 124 may couple the two carrier networks 120 and 122. A mobile switching center (MSC) 126 may be coupled to the carrier network 122 through a router 128. Generally, wired links are used between the router 114 and the MSC 126. However, wireless connectivity may also be used. To enable further expansion of the wireless communication system 100, a further carrier network 130 may be implemented and which is shown as being coupled to the router 124. A plurality of routers (e.g., edge and internal routers) may be implemented within the 'clouds' illustrating the carrier networks 120, 122 and 130.

Each of the base stations 102-108 may be assigned a unique ID (e.g., VLAN ID). The unique ID is primarily used for routing of user traffic and measurement traffic. In particular, in order to support the hand-off from a carrier network (e.g., carrier networks 120, 122, and 130), the wireless communication system 100 may use IEEE 802.1Q protocol to support VLAN ID assignment to each of the base stations 102-108, and use IEEE 802.1P protocol to ensure point-to-point (P2P) class of service for different types of traffic.

In a generic wireless communication system, there may be only a single carrier network that is to route traffic from the MSC to the base stations coupled to the carrier network. In such an arrangement, each base station is regarded as individual access point (AP), which is one wired hop through a router to access the carrier network. In other words, the end-to-end transport connection includes the MSC that receives and sends traffic from the carrier network to a base station (i.e., 1:1:1 traffic routing). Conventionally, the transmission Ethernet frame using IEEE 802.1Q protocol is only able to specify a certain VLAN ID by adding a 32-bit field between the source MAC address and the Ethernet type/length fields of the original frame. Therefore, when a router receives an incoming frame from the carrier network, the router analyzes the frame to determine the VLAN ID and forwards the frame to the associated base station.

The foregoing operational functionalities do not provide proper frame routing in the wireless communication network 100 that implements a plurality of carrier networks 120, 122 and 130 and/or base stations 104 and 106 that operate to relay traffic to other base stations 102 and 108. Specifically, unlike the 1:1:1 traffic routing, a VLAN ID in a traffic frame may be insufficient to enable proper routing through one or more of the carrier networks 120, 122 and 130 and/or base stations 104-108. Accordingly, the following algorithms are provided to support efficient traffic routing in the wireless communication network 100, which implements multiple carrier networks and series connected base stations (e.g., base stations 102 and 104). The schemes include:

(1) VM_MQ (MPLS+QinQ): a hybrid routing scheme that uses IEEE 802.1QinQ to identify VLAN IDs in multiple network layers, and adopts MPLS (multi protocol label switching protocol) to enable routing in wireless communication systems that implement a plurality of carrier networks;

(2) VM_ALL_IP (All-IP): a scheme that uses VLAN ID management and traffic routing based on IP subnet addressing techniques; and (3) VM_MS (MPLS+Subnetting): another hybrid routing scheme that uses IP subnet methodology to identify base station VLAN IDs, and uses MPLS for identifying associated carrier networks.

Regarding scheme (1), VM_MQ (MPLS+QinQ), the following first describes a frame structure to enable routing of traffic in the wireless communication system 100 that implements the plurality of carrier networks 120, 122 and 130. Second, the frame structure is described to enable routing of traffic in the wireless communication system 100 that implements series connected base stations (e.g., base stations 102 and 104).

Figure 2:
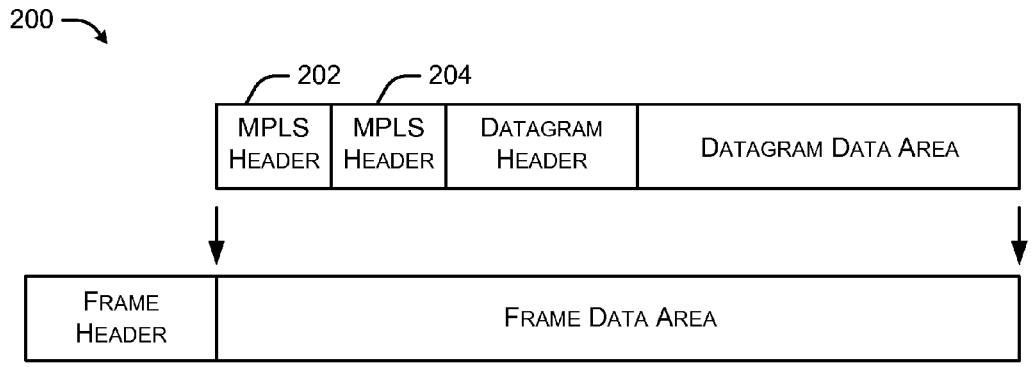
FIG. 2 illustrates an exemplary frame structure that may be utilized to enable routing of traffic in a wireless communication system that employs multiple carrier networks.

FIG. 2 illustrates an exemplary frame structure 200 that may be utilized to enable routing of traffic in the wireless communication system 100 that employs the plurality of carrier networks 120, 122 and 130. The frame 200 may include two or more MPLS headers 202 and 204. Each of the MPLS headers 202 and 204 may be used to identify a carrier network (e.g., carrier network 120 or 122) that traffic from MSC 126 is to be routed through.

Figure 3:
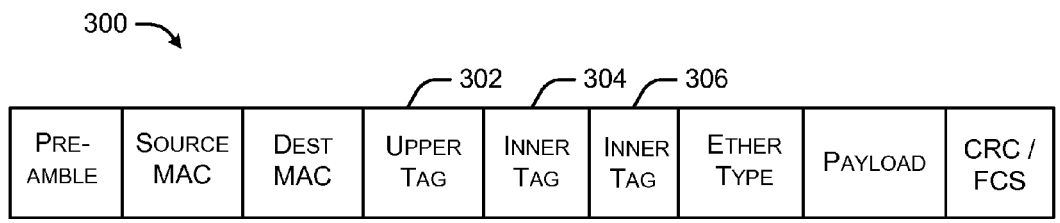
FIG. 3 illustrates an exemplary frame structure that may be utilized to enable routing of traffic in a wireless communication system that implements series connected base stations.

FIG. 3 illustrates an exemplary frame structure 300 that may be utilized to enable routing of traffic in the wireless communication system 100 that implements series connected base stations (e.g., base stations 102 and 104). The frame 300 may be concatenated with frame 200 to provide robust traffic routing in the wireless communication system 100 implementing carrier networks 120, 122 and 130 and/or base stations 104-108.

As illustrated, the frame 300 includes an upper tag 302, and two inner tags 304 and 306. Other quantities of such tags may also be implemented by the frame 300. Each of the tags 302-306 may include a VLAN ID. Therefore, the tags 302-306 may be used to route traffic between series connected base stations (e.g., base stations 102 and 104).

Figure 4:
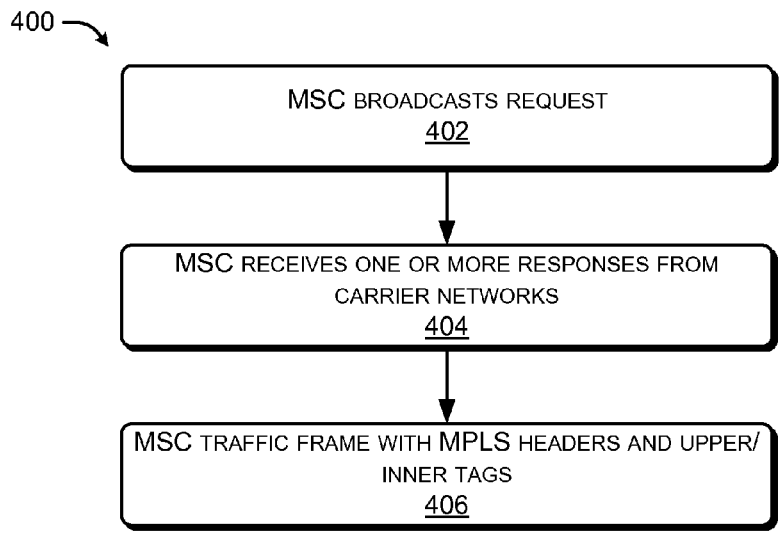
FIG. 4 is a flowchart illustrating an exemplary process that may be used by a mobile switching center (MSC) to enable robust traffic routing, using a first scheme, in a wireless communication system.

FIG. 4 is a flowchart illustrating an exemplary process 400 that may be used by an MSC (e.g., MSC 126) to enable robust traffic routing, using scheme (1), in a wireless communication system (e.g., system 100).

At block 402, the MSC broadcasts a request, including a unique ID (e.g., VLAN ID), to the carrier networks, seeking a response from a carrier network that confirms that a base station having the unique ID is coupled to the responding carrier network. At block 404, the MSC receives one or more responses back from the carrier networks, where at least one response from a carrier network confirms that a base station having the unique ID is coupled thereto. The at least one response from the carrier network may enable the MSC to determine the carrier networks and intervening serial coupled base stations that may be used to communicate traffic to the base station having the unique ID.

At block 406, the MSC concatenates traffic for the base station having the unique ID with a frame that at least includes the necessary MPLS header(s) and upper/inner tags. For example, if the traffic is to flow through two carrier networks and one base station before reaching the base station having the unique ID, the combined frame including the traffic may include one MPLS header, identifying the carrier network, and two tag sections. A first of the two tag (e.g., upper tag) sections may identify the base station having the unique ID and the second of the tag (e.g., inner tag) sections may identify a base station serially coupled to the base station having the unique ID.

Figure 5:
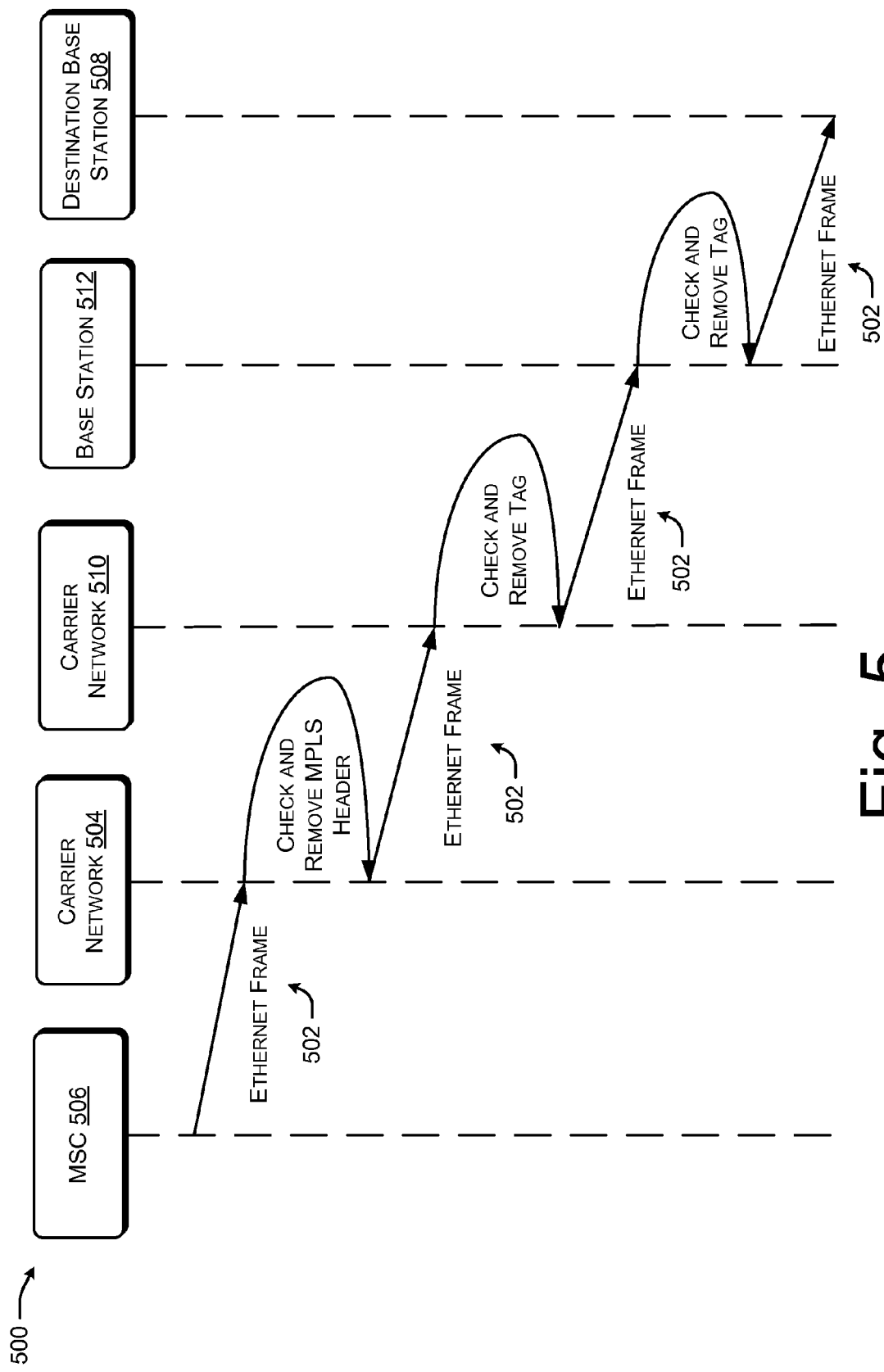
FIG. 5 illustrates the flow of a frame that includes the necessary header(s) and upper/inner tags usable to route traffic to a destination base station.

FIG. 5 illustrates the flow of a frame that includes the necessary MPLS header(s) and upper/inner tags usable to route traffic to a destination base station. An Ethernet frame 502 may be sent to a first carrier network 504 by way of the MSC 506. The Ethernet frame 502 preferably includes the necessary MPLS headers and tags to route the frame 502 to a destination base station 508. The carrier network 504 evaluates the frame 502 to determine if a next carrier network is identified in a MPLS header. If so, it removes that MPLS header and forwards the frame 502 to a carrier network 510, which was identified in the removed MPLS header. The carrier network 510 evaluates the frame 502 to determine if upper and/or inner tags are associated with the frame 502. The carrier network 510 determines that a base station 512 is identified in an inner tag of the frame 502. The carrier network 510 removes the inner tag and forwards the frame 502 to the base station 512. Finally, the base station 512 evaluates the frame 502 to determine if upper and/or inner tags are associated with the frame 502. The base station 512 determines that the destination base station 508 is identified in an upper tag of the frame 502. The base station 512 removes the upper tag and forwards the frame 502 to the destination base station 508.

Scheme (1) is described as implementing MPLS headers for identifying carrier networks associated with a communication path and QinQ tags for identifying base stations associated with the communication path. However, additional schemes are contemplated that are a derivation of scheme (1). In a first additional scheme, which is a modification of scheme (1), QinQ tags are used in place of some or all of the MPLS headers to identify carrier networks associated with a communication path. This first additional scheme is called QinQ_Stack. In a second additional scheme, which is also a modification of scheme (1), MPLS headers are used in place of some or all of the QinQ tags to identify base stations associated with a communication path. This second additional scheme is called MPLS_Stack.

Regarding scheme (2), VM_ALL_IP (All-IP), routing of traffic from an MSC to a destination base station, via a plurality of carrier networks and/or base stations, may be achieved using conventional Internet Protocol (IP) routing. IP routing is the principal communications protocol used for relaying traffic across networks and network devices. Therefore, IP may be used to route traffic in wireless communication systems that deploy a plurality of carrier networks and series connected base stations (e.g., wireless communication system 100). In one implementation, for each data frame sent from an MSC, routers (e.g., routers associated with a carrier network) evaluate an IP address associated with the data frame via a lookup table to determine the next hop for forwarding the data frame, recalculate the MAC address of the next hop, re-encapsulate the frame with the new MAC address, and forward the frame to the next destination in the wireless network system. In one particular example, routing between carrier networks is achieved using pure network IP routing and routing between base stations is achieved using subnet IP routing (e.g., subnet masking).

Regarding scheme (3), VM_MS (MPLS+Subnetting), routing of traffic from an MSC to a destination base station, via a plurality of carrier networks and/or base stations, may be achieved using MPLS (see scheme (1) described in detail herein) for routing between carrier networks and subnet IP routing (e.g., subnet masking) for routing to a destination base station.

The selection of one of the schemes 1-3 for routing traffic in a wireless communication system may be achieved based on the following considerations. A system cost function may be derived as follows:

$$C_{tot} = C_t + C_p \quad (1)$$

where $C_t$ represents the transmission cost for K bytes source data (e.g., traffic) from an MSC to a destination entity (e.g., base station), $C_p$ is the processing cost associated with one or more routers for K bytes of source data during the one direction trip, and $C_{tot}$ is the total cost.

For K bytes source data, more Ethernet frames are required when using the VM_MQ (MPLS+QinQ) scheme rather than the VM_MS (MPLS+Subnetting) scheme, and more Ethernet frames are required when using VM_MS (MPLS+Subnetting) scheme rather than VM_ALL_IP (All-IP) algorithm. This is because the overhead size associated with VM_MQ is larger than the overhead size associated with VM_MS, and the overhead size associated with VM_MS is larger than the overhead size associated with VM_ALL_IP. The total end to end transmission cost for K bytes source data using scheme i can be expressed as in equation (2)

$$C_t(i) = \left\lceil \frac{K}{M - E_i - I_i - H} \right\rceil * \varepsilon * D \quad (2)$$

where K represents the total size of source data (in bytes), M is the transmission frame size, $E_i$ is the size of Ethernet frame headers of scheme i in the frame, $I_i$ is the size of the IP header of a frame in accordance with the scheme i, and H represents other control headers in the frame, E is the average transmission cost per router, D is the total distance, based on the number of intervening routers, from the MSC to a destination base station, and $\lceil \ \rceil$ symbol is the ceiling operation.

The processing cost $C_p$ of scheme i, can be expressed as follows:

$$C_p(i) = \sum_{j \in R} C_{p,j}(i) = \left\lceil \frac{K}{M - E_i - I_i - H} \right\rceil * \sum_{j \in R} (\alpha * \rho_{i,j} + \beta * \sigma_{i,j}) \quad (3)$$

where j represent router j, R is all routers set in transport link, $\rho_{i,j}$ is the average packet processing cost of a transmission frame at router j using scheme i, while $\sigma_{i,j}$ is the average cost for table look-up for frame at router j using algorithm i, $\alpha$ and $\beta$ are weights for packet processing and table look-up, which are pre-set values and satisfy $\alpha + \beta = 1$. It is assumed that there are a total of $N_i$ routers between the MSC and the destination base station when using scheme i. Therefore, the goal is to minimize the total system cost by using scheme i:

Minimize $C_{tot}$=Minimize($C_t + C_p$)

s.t. $0 \leq i \leq 2; 0 \leq j \leq N_i - 1$. \quad (4)

Referred to (2), it is known that packet processing cost $\rho_{i,j}$ at a router is mainly determined by checking the header, removing the header, and re-encapsulation of a new Ethernet frame. Therefore, if there is extra overhead in a frame, the processing of the frame will involve additional processing time and cost. On the other hand, if IP routing is implemented, there is addition processing time and cost for frame re-encapsulation as compared to using MPLS labeling to enable frame routing between carrier networks.

Furthermore, the table look-up cost $\sigma_{i,j}$ at a router is determined by node (base station) number and the subnet structure. From the view of MSC, it is possible to derive the network topology for the carrier networks and base stations as a tree structure. Therefore, the MSC may use the tree structure to determine a destination base station by way of a simple search of the tree structure.

To summarize, scheme (1), VM_MQ (MPLS+QinQ), uses frame overhead to specify carrier network information and one or more unique IDs for a destination base station, but the scheme does not use table lookup to route traffic. Scheme (3), VM_MS (MPLS+Subnetting), requires table lookup to route traffic after carrier network routing is complete. Finally, scheme (2), VM_ALL_IP (All-IP), requires table lookup for routing in both the carrier network and base station domains.

The appropriate scheme selection may be achieved by considering the number of frames, topology layer number and the processing cost for each frame. Ideally, if all system parameters in equation (4) are all known, a minimum cost may be determined among all three schemes through Linear Programming (LP). However, in an operational environment, it may be difficult for the MSC to know system parameters of each carrier network and/or base station implemented in the wireless communication network. Thus, it may be beneficial to determine end to end round-trip delay to estimate the cost for each scheme 1-3. The round-trip delay $D_{i,L}$ of pinged K bytes of data using scheme i between the MSC and the base station cluster L that connects with one or more carrier networks through a cluster L, may be calculated as follows:

$$D_{i,L} = \sum_{k=1}^{\sigma L} \sum_{j=1}^{\vartheta} d_{i,j,k} \quad (5)$$

where $$\vartheta = \left\lceil \frac{K}{M - E_i - I_i - H} \right\rceil,$$

$d_{i,j,k}$ is the round trip delay, between the MSC and a base station k, of a packet j transmitted using scheme i, and $\sigma_L$ is the total number of base stations in cluster L.

In one implementation, the MSC transmits K bytes of ping data using scheme i to each base station in cluster L to measure the round-trip time for the data sent from the MSC to a destination base station. The MSC calculates the delay $D_{i,L}$ associated with each scheme i. The MSC may choose the scheme i which has the minimum delay for cluster L.

Because traffic intensity associated with carrier networks and base station clusters may change from time to time, the processing costs associated with handing traffic in a wireless communication network may change. Furthermore, adding or removing routers associated with carrier networks and/or in base station clusters may cause routing lookup table sizes to change, which may affect the time required to access IP routing lookup tables. The foregoing may render a previously calculated delay $D_{i,L}$ and selected scheme i obsolete or less than optimum. Therefore, it may be beneficial to periodically measure the round-trip time for the data sent from the MSC to a destination base station and reselect the scheme i which has the minimum delay for cluster L.

Implementations related to efficient and optimal traffic routing within individual carrier networks and optimal traffic routing among a plurality of carrier networks, when more than one carrier network path is possible, are described in the following. First, optimal traffic routing within individual carrier networks will be described and second, optimal traffic routing among a plurality of carrier networks will be described.

Figure 6:
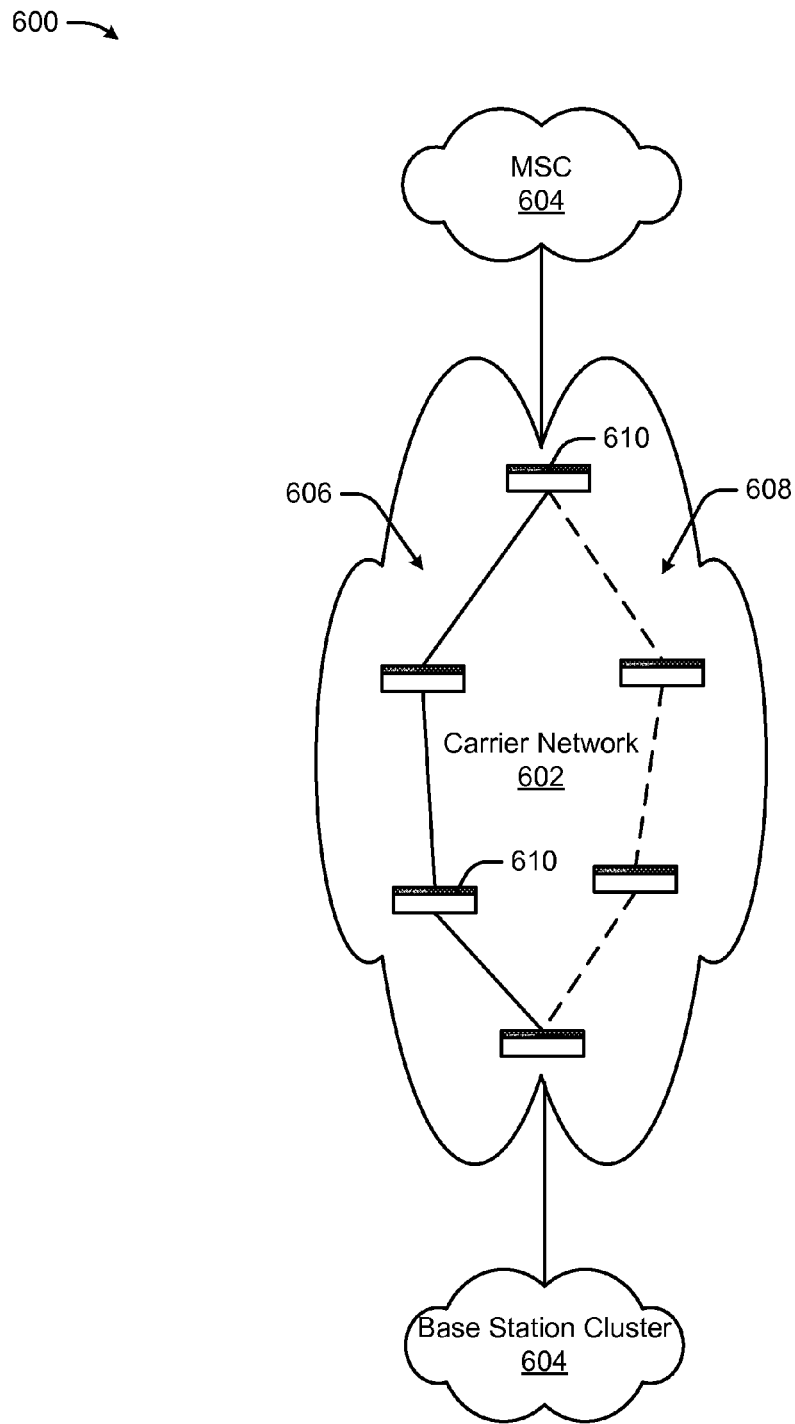
FIG. 6 illustrates a portion of a wireless communication network that includes a carrier network coupled to an MSC on one end and a base station cluster on another end.

FIG. 6 illustrates a portion of a wireless communication network 600 that includes a carrier network 602 coupled to an MSC 604 on one end and a base station cluster 604 on another end. Two traffic paths 606 and 608, comprised of multiple routers 610 and wire links, are implemented in the carrier network 602. Additional traffic paths may also be implemented in the carrier network 602. In general, only one traffic path, path 606 or 608, is used to communicate traffic received by the carrier network 602. In one implementation, an optimum traffic path for communicating traffic is determined initially and periodically.

For analysis convenience, a QoS function, based on a backhaul service level agreement (SLA), may be used. Because trip frame delay, jitter, frame loss rate and service availability are main metrics for evaluating carrier performance, the QoS function of a carrier network i may be derived as:

$$Q_i = Q(d_i, j_i, l_i, r_i) = r_i * (w_d * e^{-d_i/D} + w_j * e^{-j_i/J} + w_l * e^{-l_i/L}) \quad (6)$$

$r_i$ is the mean service availability of a carrier network i, $d_i$, $j_i$ and $l_i$ are the mean delay, mean jitter, and mean frame loss rate of a carrier network i, respectively. d, j, and/represent maximum allowable values of frame delay, jitter, and frame loss rate defined in Service Level Agreement (SLA), respectively. And $w_d$, $w_j$, and $w_l$ are weights of delay, jitter, and frame loss rate, respectively.

Accordingly, as is seen from QoS function (6), a higher delay, jitter, or frame loss rate, results in a lower and less desirable value. On the other hand, a higher service availability/reliability provides a higher and more desirable value.

Figure 7:
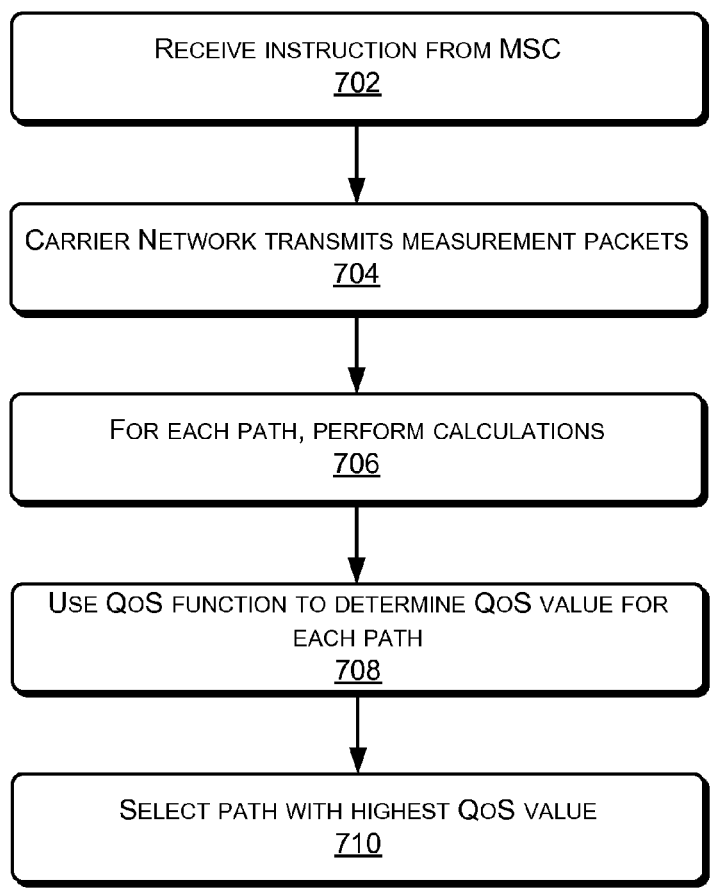
FIG. 7 is a flowchart of a process that may be implemented to determine an optimum traffic path, within a carrier network, to carry traffic communicated to and from an MSC.

FIG. 7 is a flowchart of a process 700 that may be implemented to determine an optimum traffic path (e.g., traffic path 606 or 608), within a carrier network, to carry traffic communicated to and from the MSC 604. It is assumed that each path considered will have common edge routers at the periphery of the carrier network. The process 700 may be executed by any device or entity within a wireless communication system. In one particular implementation, the MSC executes the process 700. In another particular implementation, a base station or cluster of base stations executes the process 700.

At block 702, an MSC instructs a carrier network to identify a plurality of existing and/or additional traffic paths within the carrier network. Ideally, each traffic path, except for a common set of edge routers, will include unique routers. Therefore, if a determined initial path includes first and second routers, in addition to the edge routers of the carrier network, no other path determined by the process with include the first and second routers. The process of identifying the particular paths may involve considering QoS and shortest distance (e.g., Dijkstra's shortest route algorithm). At block 704, the carrier network transmits measurement packets for a predetermined period on each of the traffic paths implemented by the carrier network.

At block 706, the carrier network calculates and stores, in a lookup table in one implementation, an average delay, jitter and frame loss rate associated with each path in the carrier network. At block 708, using the QoS function (6), a QoS value for each path may be determined. In one implementation, the QoS value determined for each path may include first determining the QoS value for each segment (e.g., between two routers) in the path. A final QoS for the path would therefore be the sum of the segment QoS values of each segment in the path. Furthermore, in one implementation, the process 700 also considers a shortest route function (e.g., Dijkstra's shortest route algorithm) in determining the individual paths. That is, the shortest path with the highest QoS value would be a very attractive path if not the optimum choice.

At block 710, the carrier network selects the path with the highest determined QoS value as the primary traffic path for use by the carrier network. The other paths may be ranked according to determined QoS values. From time to time or on a predetermined basis, the carrier network may repeat the process 700 to determine if there is a traffic path with a higher QoS value than that of the primary traffic channel.

Implementations related to efficient and optimal traffic routing among a plurality of carrier networks will be described in the following.

Figure 8:
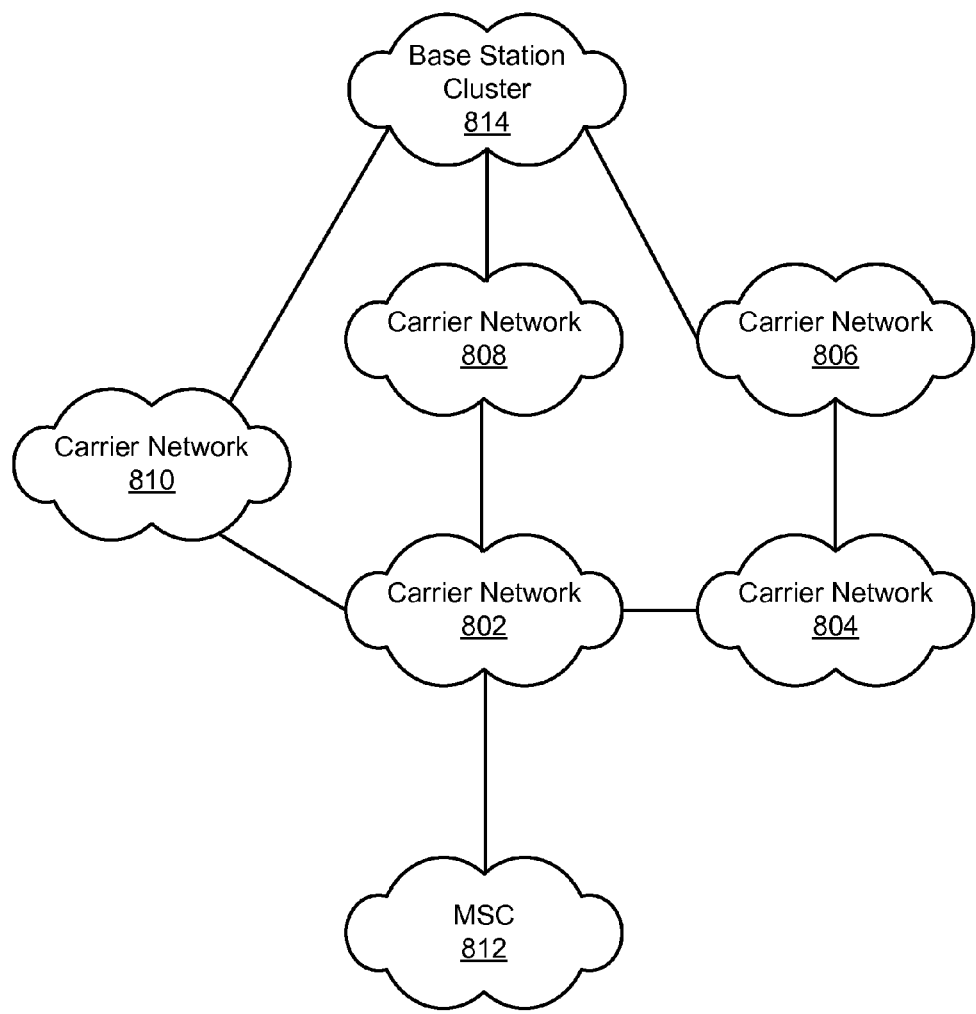
FIG. 8 illustrates a wireless communication system that includes a plurality of carrier networks coupled between an MSC and a base station cluster.

FIG. 8 illustrates a wireless communication system 800 that includes a plurality of carrier networks 802, 804, 806, 808 and 810 coupled between an MSC 812 and a base station cluster 814. The shortest path for traffic within the wireless network system 800 may be defined by carrier networks 802 and 808. However, alternative paths for traffic also exist. For example, one alternative path may include using carrier networks 802 and 810 for traffic, or another alternative path may include using carrier networks 802, 804 and 806 for traffic. Depending on the number and connectivity characteristics of the carrier networks implemented in the wireless communication system, any number of unique paths defined by carrier networks may exist in a communication system.

Figure 9:
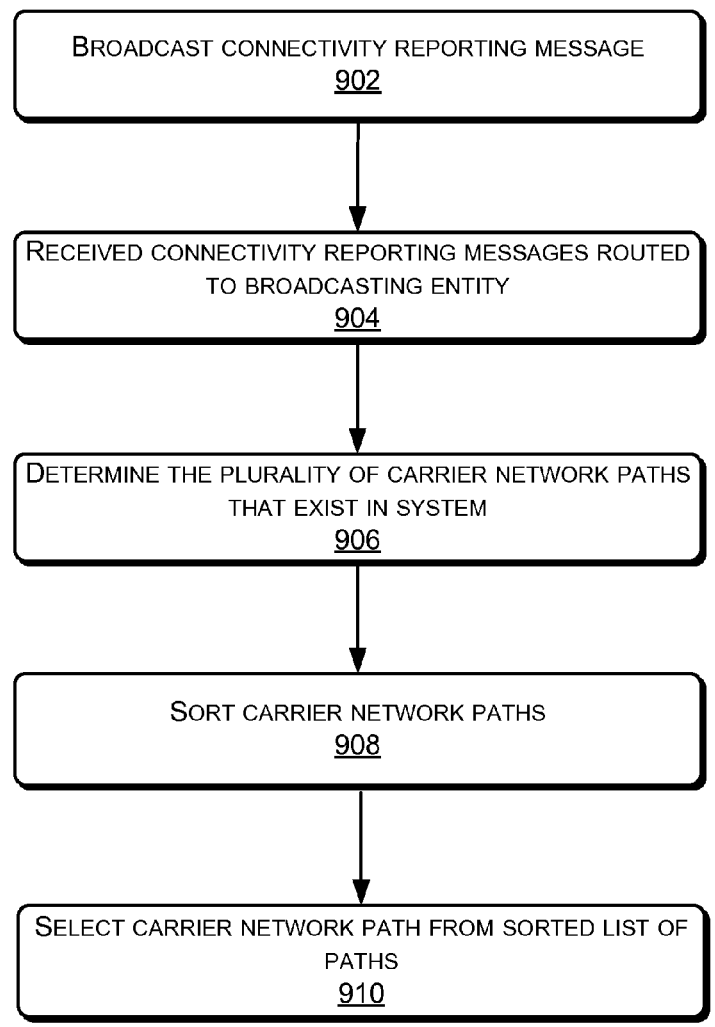
FIG. 9 is a flowchart of a process that may be implemented to determine an optimum carrier network traffic path, within a wireless communication system, to carry traffic communicated to and from the MSC.

FIG. 9 is a flowchart of a process 900 that may be implemented to determine an optimum carrier network traffic path, within a wireless communication system (e.g., wireless communication system 800), to carry traffic communicated to and from the MSC 812. The process 900 may be executed by any device or entity within a wireless communication system. In one particular implementation, the MSC executes the process 900.

At block 902, the MSC broadcasts a message requesting connectivity reporting from carrier networks associated with the wireless communication system. In particular, the message requests carrier network connectivity information that identifies the edge routers that are coupled to carrier networks in the system. At block 904, an end point in the system, such as a base station cluster or an MSC, routes received connectivity reporting messages back to the MSC, via the same carrier networks that communicated a given connectivity reporting message to the base station cluster.

At block 906, the MSC ascertains, from messages received from the base station cluster and which include information about particular carrier networks in a path, the plurality of carrier network paths that exist in the system. At block 908, the MSC sorts the carrier network paths in accordance with the number of carrier networks in a given path (e.g., shortest path) and the sum of the mean QoS values associated with each carrier network in the path. At block 910, the system selects a carrier network path from the sorted carrier path list. In one implementation, the selected carrier network path is the first carrier network path in the carrier path list. As processing and implementation specifics dictate, the process 900 may be repeated to determine if a current carrier network path may be changed to another carrier network path offering improved traffic routing efficiencies.

In a particular implementation, the process 900 determines and considers a QoS value of a link between each router in the system. Furthermore, the process 900 considers a shorted route determination, based on Dijkstra's shortest path algorithm, as part of the process to identify paths included in the sorted carrier network path list. Furthermore, the process 900 generates paths in the sorted carrier path list that are unique, except for ingress and egress carrier networks in the system.

Figure 10:
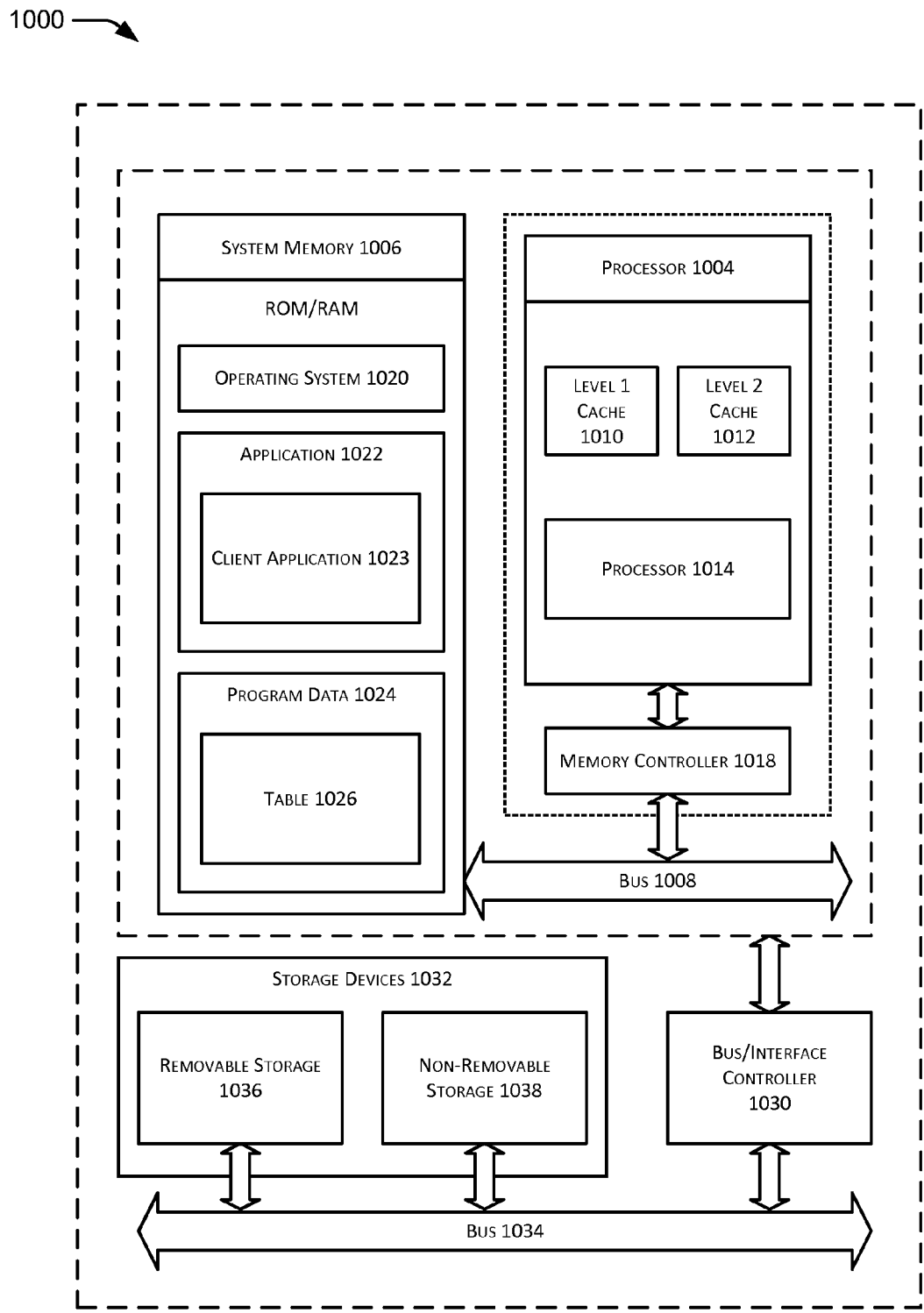
FIG. 10 shows a sample computing device that may be used to implement the various devices and functionalities described herein.

FIG. 10 shows sample computing device 1000 that may be used to implement the various devices and functionalities described herein. More particularly, FIG. 10 shows an illustrative computing embodiment, in which any of the operations, processes, etc. described herein may be implemented as computer-readable instructions stored on a computer-readable medium. The computer-readable instructions may, for example, be executed by a processor of a mobile unit, a network element, and/or any other computing device.

In an example configuration, computing device 1000 may typically include one or more processors 1004 and a system memory 1006. A memory bus 1008 may be used for communicating between processor 1004 and system memory 1006.

Depending on the desired configuration, processor 1004 may be of any type including but not limited to a microprocessor, a microcontroller, a digital signal processor (DSP), or any combination thereof. Processor 1004 may include one more levels of caching, such as level one cache 1010 and level two cache 1012, and processor core 1014. Cache 1004 may be implemented as level one cache 1010 and at least one embodiment of storage 1012 may be implemented as level two cache 1012.

An example processor core 1014 may include an arithmetic logic unit (ALU), a floating point unit (FPU), a digital signal processing core (DSP Core), or any combination thereof. Processor 1004 may be implemented as processor core 1014. Further, example memory controller 1018 may also be used with processor 1004, or in some implementations memory controller 1018 may be an internal part of processor 1004.

Depending on the desired configuration, system memory 1006 may be of any type including but not limited to volatile memory (such as RAM), non-volatile memory (such as ROM, flash memory, etc.) or any combination thereof. System memory 1006 may include an operating system 1020, one or more applications 1022, and program data 1024.

Application 1022 may include Client Application 1023 that is arranged to perform the functions as described herein including those described previously with respect figures herein. Program data 1024 may include table 1026, which may include one or more look-up tables.

Computing device 1000 may have additional features or functionality, and additional interfaces to facilitate communications between any required devices and interfaces. For example, bus/interface controller 1030 may be used to facilitate communications between one or more data storage devices 1032 via storage interface bus 1034. Data storage devices 1032 may be removable storage devices 1036, non-removable storage devices 1038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1006, removable storage devices 1036, and non-removable storage devices 1038 are examples of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of computing device 1000.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. A system comprising:
   a plurality of carrier networks;
   a base station cluster coupled to at least one of the carrier networks of the plurality of carrier networks; and
   a device associated with the system, the device including at least a processor and a memory coupled to the processor, the memory including instructions executable by the processor to:
   select, from a plurality of traffic routing schemes, a traffic routing scheme usable to enable routing of traffic in the system, one of the plurality of traffic routing schemes being a hybrid routing scheme that uses IEEE 802.1QinQ to identify a unique ID associated with a base station and MPLS (multi protocol label switching protocol) to enable routing of traffic to at least one base station of the base station cluster.

2. A system as recited in claim 1, wherein one of the plurality of traffic routing schemes uses strictly IP routing to enable routing of traffic to the plurality of carrier networks and base stations of the base station cluster.

3. A system as recited in claim 1, wherein one of the plurality of traffic routing schemes is a hybrid routing scheme that uses an IP subnet methodology to identify unique IDs associated with base stations and MPLS (multi protocol label switching protocol) to enable routing of traffic to the base stations of the base station cluster and the plurality of carrier networks.

4. A system as recited in claim 1, wherein the selected traffic routing scheme generates a frame that includes a plurality of MPLS (multi protocol label switching protocol) headers, each header identifying a carrier network in the system.

5. A system as recited in claim 4, wherein the selected traffic routing scheme generates the frame to include at least one tag identifying a base station in the system.

6. A system as recited in claim 1, wherein the selected traffic routing scheme generates a frame that includes a plurality of MPLS (multi protocol label switching protocol) headers, each header identifying a carrier network in the system, and at least one tag identifying a base station in the system.

7. A system as recited in claim 6, wherein the frame is generated to further include payload data for delivery to the base station identified by the tag.

8. A system as recited in claim 1, wherein the selected traffic routing scheme generates a frame that includes a plurality of MPLS (multi protocol label switching protocol) headers, each header identifying a carrier network in the system.

9. A system as recited in claim 8, wherein the selected traffic routing scheme generates the frame to include at least one unique ID identifying a base station in the system, the unique ID included in a subnet address field of the frame.

10. A method comprising:
    identifying at least a plurality of carrier networks implemented in a backhaul system;
    identifying at least a plurality of base stations coupled to one of the plurality of carrier networks; and
    generating a frame to include overhead information to route the frame to one of the at least a plurality of base stations, the frame being generated by one of at least a plurality of schemes usable to generate the frame, one of the plurality of traffic routing schemes being a hybrid routing scheme that uses IEEE 802.1QinQ to identify a unique ID associated with a base station and MPLS (multi protocol label switching protocol) to enable routing of traffic to at least one base station of the plurality of base stations.

11. A method as recited in claim 10, wherein the one of at least a plurality of schemes is selected based on comparing system performance of evaluation data generated by each of the plurality of schemes for generating the frame.

12. A method as recited in claim 10, wherein the one of at least a plurality of schemes uses strictly IP routing to enable routing of traffic to the plurality of carrier networks and the base stations.

13. A method as recited in claim 10, wherein the one of at least a plurality of schemes is a hybrid routing scheme that uses an IP subnet methodology to identify unique IDs associated with base stations and MPLS (multi protocol label switching protocol) to enable routing of traffic to the base stations and the plurality of carrier networks.

14. A system comprising:
    a plurality of carrier networks;
    a base station cluster coupled to at least one of the carrier networks of the plurality of carrier networks; and
    A switching center associated with the system, the switching center including at least a processor and a memory coupled to the processor, the memory including instructions executable by the processor to:

select, from a plurality of traffic routing schemes, a traffic routing scheme to route traffic in the system, the traffic routing schemes including at least:
- a strictly IP based scheme usable to enable routing of traffic via the carrier networks to a destination base station associated with the base station cluster,
- a first hybrid scheme usable to enable routing of traffic via the carrier networks to a base station associated with the base station cluster, the first hybrid scheme to use at least MPLS (multi protocol label switching protocol) to generate headers that include carrier network information, and
- a second hybrid routing scheme that uses IEEE 802.1QinQ to identify a unique ID associated with a base station and the MPLS to enable routing of traffic to a base station associated with the base station cluster.

15. A method comprising:

identifying at least a plurality of carrier networks implemented in a backhaul system;

identifying at least a plurality of base stations coupled to one of the plurality of carrier networks; and generating a frame to include overhead information to route the frame to one of the at least a plurality of base stations, the frame being generated by one of at least a plurality of schemes usable to generate the frame, the one of at least a plurality of schemes being a hybrid routing scheme that uses an IP subnet methodology to identify unique IDs associated with base stations and MPLS (multi protocol label switching protocol) to enable routing of traffic to the base stations and the plurality of carrier networks.

* * * * *